United States Patent [19]

Shvakhman et al.

[11] Patent Number: 4,514,538
[45] Date of Patent: Apr. 30, 1985

[54] NOVEL COMPOSITION

[76] Inventors: Lidia Shvakhman, 236 Montrose Ave., Kenmore, N.Y. 14217; Ignatius T. Agro, 492 West Ave., Buffalo, N.Y. 14213; Louis L. Chiusolo, 230 Glenwood Crescent, Oshawa, Ontario, Canada

[21] Appl. No.: 498,482

[22] Filed: May 26, 1983

[51] Int. Cl.³ .......................... C08K 5/10; C08L 1/12; C08L 33/12
[52] U.S. Cl. .................... 524/315; 106/180; 106/181; 106/189; 106/33; 524/447
[58] Field of Search .............. 524/447, 386, 315; 523/173; 106/193, 33, 189, 181, 180; 501/127

[56] References Cited

U.S. PATENT DOCUMENTS

| | | | |
|---|---|---|---|
| 2,065,512 | 12/1936 | Cannon | 166/292 |
| 2,277,286 | 3/1942 | Bechtner | 405/107 |
| 2,757,737 | 8/1956 | Schremp | 524/447 |
| 3,076,718 | 2/1963 | Gearhart et al. | 106/180 |
| 3,445,322 | 5/1969 | Saiia | 428/117 |
| 3,561,177 | 2/1971 | Agro et al. | 428/117 |
| 3,986,365 | 10/1976 | Hughes | 106/900 |
| 4,279,547 | 7/1981 | Clem | 405/258 |
| 4,316,833 | 2/1982 | McGroarty | 524/447 |
| 4,366,284 | 12/1982 | Ishido | 524/447 |

Primary Examiner—Theodore Morris
Attorney, Agent, or Firm—James J. Ralabate

[57] ABSTRACT

A bentonite composition useful in preventing the flow of water through a structure to be waterproofed is disclosed. This composition comprises at least about 75% to 96% of a substantially unswelled bentonite and the remainder a film forming composition, said film forming composition comprising an organic binder that is solid at room temperature and is substantially unreactive with said bentonite. This bentonite is suspended substantially uniformly throughout said film forming composition to form thereby a substantially self-sustaining waterproofing element. The film forming composition contains an alkylphthalate present in from about 0.1% to 5% of said total composition.

7 Claims, No Drawings

COMPOSITION

This invention relates to compositions useful in the construction industry, and, more specifically, to novel compositions useful in waterproofing a structure.

BACKGROUND OF THE INVENTION

It is known to use bentonite or bentonite-containing materials as a waterproofing agent in the construction industry. The bentonite clay compositions are known to swell when contacted with water and accordingly are used against exterior structures such as mines, dams, artificial lakes, reservoirs, expansion joints, masonry construction, oil wells, pipes, building foundations, basements and other structures to prevent or minimize the entrance of water therein. The bentonite materials are generally dispersed or suspended in non-aqueous mediums such as crude oil, alcohol, or gelling agents. Highly colloidal clay or other materials which possess the capacity to swell or gelatinize upon contact with water are also known carriers for the bentonite waterproofing material. Ingredients such as further gelling agents, waxes, thickening agents and the like are usually incorporated into the waterproofing composition to enhance its sustaining properties, however the presence of these ingredients also reduces the percent of the effective component bentonite clay in the composition. The bentonite clay used in the prior art has been of both the swelling and non-swelling types depending upon the desired effects. It has been incorporated in solid structures such as barriers formed of concrete, containing structures or grids, sand or gravel, or other solid containers and membranes.

In using waterproofing compositions, it is important to utilize compositions having maximum waterproofing properties. In known compositions, putty-like masses are formed from bentonite having added thereto from 100 to about 150 parts water for each 100 parts bentonite. The resulting pre-swelled materials have already used up part of their water absorbing properties and are thus not mass-effect efficient. About 30% of the bentonite used is rendered relatively ineffective because of the necessary pre-swelling as a result of the partial initial hydration. An embodiment similar to this pre-swelled composition is disclosed in U.S. Pat. No. 2,277,286.

Other compositions utilize bentonite gels containing in addition to the bentonite clay a non-aqueous liquid and a gelling agent. The base of the waterproofing composition is a non-aqueous medium with agar agar. The non-aqueous medium could be oil, glycerine, or an alcohol. The non-aqueous liquid usually could comprise up to 85% by weight of the total composition, and the gelling agent is added in amounts of from 15-60%. The range left for the bentonite clay usually is from about 30% to 70% by weight of the total bentonite composition. This means that from about 30% to 70% of the waterproofing composition is non-waterproofing in nature, because of the necessary addition of materials to maintain the cohesiveness of the material. These materials have been used as waterproofing compositions having the consistency of modeling clay or in the alternative, can be applied over the face or surface of a water permeable support sheet such as corrugated paperboard. In either embodiment, the compositions contain a significant amount of non-functional waterproofing ingredients. Compositions similar to these are disclosed in U.S. Pat. Nos. 4,279,547 and 2,065,512.

The prior art therefore provides waterproofing materials, or paste-like masses, that are water pre-swelled, thus losing effectiveness, and diluted in content in final composition, thus again further losing effectiveness.

Other systems comprise the use of membranes supports or casings to contain the waterproofing compositions. The casing of water permeable material contains the bentonite waterproofing composition and permits water or other liquids to pass therethrough and contact the bentonite. Upon contact, the water activates the water impeding characteristics of the bentonite composition. On the opposite face of the bentonite containing composition is a water impervious membrane designed in a predetermined pattern for retaining the bentonite material in its intended position. The water impervious membrane is necessary to prevent the rupture of the permeable face or sheathing and to prevent loss of the bentonite material before activation.

Various water permeable support sheets have been used such as those disclosed in U.S. Pat. Nos. 4,279,547 and 3,445,322. These water permeable sheets contain the bentonite composition and also permit water to contact this composition to activate its water impeding characteristics. Not only is it relatively expensive to manufacture these waterproofing components, but also the surface contact with the actual waterproofing material is reduced substantially. The prior art sheets or building components usually comprise a waterproofing material sandwiched between a water impervious backing material on one face and a water pervious facing layer on the other face. The building components consist of a plurality of compartments into which the composition is housed, part of the area of the component face consists of the water impervious material and the remainder waterproofing composition. Irrespective of the configuration or design of the component, the waterproofing area that contacts the inner face of the water pervious layer is substantially less than maximum area. This is because the receptacles that contain the waterproofing composition must by necessity take up part of this area. Various configurations are disclosed in U.S. Pat. Nos. 2,277,286; 3,445,322; 3,561,177; and 4,279,547.

A further serious problem in prior art waterproofing structures is that because of the cardboard or paperboard facings, the bentonite is not held firmly in place when in use. The cardboard outer and surface facings contain the bentonite materials in a sandwich-like configuration. The cardboard has an internally corrugated surface into which the bentonite fits and is maintained. However, upon becoming wet, the cardboard looses its holding capacity and the bentonite falls to the bottom of the sandwich-like structure and is thus not effective as a waterproofing agent. Once the bentonite is dislocated from its original position along the entire facing area, the waterproofing properties of the structure are lost.

Further, when paperboard or cardboard are used as facings, the cardboard deteriorates in time and upon becoming wet, causes the bentonite to sag or fall. When this occurs, the waterproofing properties are seriously impaired at the stage where maximum waterproofing is desired, i.e., during water seepage or contact. Also it is not unusual for the cardboard facing to easily puncture and allow the waterproofing material or bentonite to seep out of position. Again, this substantially reduces the total effectiveness of the waterproofing structure.

The prior art, therefore, provides structures and systems for waterproofing components having at least three major drawbacks:
(1) They are often water pre-swelled, thereby losing the pre-swelled portion effectiveness when activated in use by contact with water or liquids;
(2) They are often diluted with substantial amounts of other components such as gelling agents, dispersing agents, non-aqueous liquids, waxes, thickening agents and other relatively non-functional waterproofing ingredients;
(3) They are often used together with structures that have receptacles that impede or minimize the area contact of the waterproofing material with the surface structure to be waterproofed.

SUMMARY OF THE INVENTION

It is therefore an object of this invention to provide a waterproofing composition devoid of the above-noted disadvantages.

It is another object of this invention to provide a waterproofing composition that is relatively easy and economical to manufacture.

Another object of this invention is to provide a waterproofing composition that will provide maximum surface exposure to the structure to be treated.

A further object of this invention is to provide a waterproofing composition that has a relatively high content of waterproof functioning material.

A still further object of this invention is to provide a waterproofing material that is self-sustaining and does not require a receptacle containing structure for support and retention.

A still further object of this invention is to provide a waterproofing material and component that is substantially thermally stable, and avoids the accumulation of deteriorating excess condensation.

Another still further object of this invention is to provide a waterproofing composition that can be incorporated into a flexible structure that has multiple uses.

Yet another object of this invention is to provide a waterproofing composition that has substantially full water expansion potential and will not be easily deteriorated.

These objects and others are accomplished in accordance with this invention by providing a self-sustaining waterproofing composition comprising at least 75 parts by weight of bentonite (sodium montmorillonite), a clay which swells at least about 12 times when wetted with water and has strong water-absorbing properties. The remainder of the waterproofing composition being a binder or film former comprising:
(A) a material selected from the group consisting of dialkylphthalate, dialkyloxalate, succrose acetate isobutyrate, glycerine, and mixtures thereof;
(B) a material selected from the group consisting of polyalkylmethacrylate, cellulose acetate, polyvinylalcohol, polyvinylbutyral, and mixtures thereof.

It is critical to this invention that the bentonite used be wetted with solvent prior to formulation. The purpose of the wetting is to improve the solubility of the bentonite and correspondingly to improve its adhesion qualities in the present formulation. This pre-wetting does not adversely effect the swelling properties of the bentonite in any manner, but it does precondition the bentonite for easy adhesion when formulated. If the bentonite is included in the formulation in its dry form substantially inferior results are obtained.

Any suitable bentonite composition may be used in the waterproofing formulation of this invention. Bentonite consists generally of $Al_2O_3.4SiO_2.H_2O$, and is a hydrated aluminum silicate clay found all over the world and one high quality, high swelling form is found in the midwest of the United States of America. Small amounts of alkaline substances if suitable may be added to the bentonite to increase its swelling properties. Bentonite compositions (prior to pre-swelling) such as those disclosed in U.S. Pat. Nos. 2,065,512; 2,277,286; 3,445,322; 3,561,177; and 4,279,547 may be used in the formulation of this invention. The bentonite is used in an amount of at least 75 parts by weight of the total formulation.

The second ingredient used in the formulation is a member selected from the group consisting of a dialkylphthalate, dialkyloxalate, sucrose acetate isobutyrate, glycerine, and mixtures thereof in amounts of about from 0.1 to 6 parts by weight of the final total composition. Any suitable polyalkylphthalate may be used if desired; however, it was found that use of dibutylphthalate resulted in preferred results.

The third ingredient is at least one substance selected from the group consisting of a polyalkylmethacrylate, cellulose acetate, polyvinylalcohol, polyvinylbutyral, and mixtures thereof. This material is used in from about 0.1 to 8 parts by weight of the final composition.

An ingredient present in making the composition and in the formulation is any suitable highly volatile solvent in amounts of from about 20 to 60 parts by weight. The binder material may be prepared from any thermoplastic synthetic resin base such as acrylic materials.

The bentonite material in the present formulation has substantially 100% expansive or swelling capability and is not diluted in various non-functional components such as swelling agents. The film forming organic formulation used with the bentonite provides a binder which carries the bentonite and forms a self-sustaining bentonite-binder layer. This film does not require any backing, framing or facing, and can be formed into self-sustaining sheets, rods, or other independent structures. This feature will be referred to as "self-sustaining" throughout this disclosure. The two open faces or sides of this layer structure permit maximum and direct exposure to the structure to be waterproofed. Of course, retaining structures may be used if desired.

The manufacture of the composition of this invention is relatively simple. Formulation is prepared at room temperature with no heating of the ingredients required. For purposes of this invention, a "suitable solvent" is defined as: a solvent having high volatile properties and typical solvents are: benzene, toluene, xylene, hexane, cyclohexanole, cyclohexane, methylcyclohexanole, dioxane, ethylacetate, acetone, amylacetate, propylacetate, methylethylketone, ethylcellosolve, isopropylalcohol, methanol, ethylalcohol and isoamylalcohol.

If it is desired to use a backing material for some reason, any suitable substrate may be used such as synthetics, wood, polyethylene, styrofoam, polyurethane, metal, cloth, webbing, masonite, corrugated paperboard and Mylar. The resin content of the binder material should be sufficiently high to produce a high tack, high strength adhesive. Suitable binder materials include cellulose acetate, polymethacrylates, polyvinylalcohol, polyvinylbutyral, and mixtures thereof. A plasticizer may be incorporated into the binder material, if desired; however, the selected plasticizer should be compatible with the binder. Plasticizers that may be used are dibutylphthalate, dioctylphthalate, diethyloxalate, sucrose acetate isobutyrate, diisodecylphthalate, glycerine may be used successfully with polymethacrylate such as (poly-n-butyl methacrylate, polyethylmethacrylate, polymethylmethacrylate), cellulose acetate, polyvinyl alcohol, polyvinyl butyral. The plasticizers specified above decomposed completely and have an excellent softening effect on the binder. The volatile solvent should preferably dissolve binder and plasticizer without chemically reacting with the slurry. The solvent utilized to produce the slurry can be acetone, amyl acetate, ethyl alcohol, benzene, cyclohexanole or other above-noted highly volatile common solvents. The mixture of different solvents such as acetone and benzene, acetone and amyl acetate, amyl acetate and benzene, water and ethyl alcohol are very useful and thickness of building components requires a different composition of these solvents. For thin impregnated membranes, ethyl alcohol is an extremely useful solvent medium.

Slurry containing selected pre-wetted bentonite granules, binder, plasticizer and solvent is deposited onto honeycomb grids having two open faces or other suitable convolutions in a uniformly thick and smooth layer, dryed by fan at room temperature of slightly higher temperature. It was found that several types of adhesives could be successfully used in combination with bentonite slurry. Such adhesives can be water base, solvent base or water or solvent base types. Using the specific compositions to make slurry flowable, the approximate ratio of the selected solvent relative to the bentonite will be ranged from 1:6 to 1:2. The proportions of the various slurry components are determined by several considerations. The selected bentonite granules constitutes from 75% to 98% by weight of the final composition. To obtain the desired tackiness and properties, the ratio of plasticized binder to bentonite must be selected within certain ranges, which will vary somewhat depending on the particle size of the bentonite and the properties of the binder and plasticizer. Actual amounts of the ingredients may be varied within wide ranges but the major proportion of bentonite is required. It was found that by changing ratio range between binder to plasticizer from 1:2 to 5:1, it would be able to produce low or high viscosity adhesive. Also it was found that using a combination of different binders or plasticizers may be very helpful.

The waterproofing composition of this invention is self-sustaining and can be made into a self-supporting structure such as boards, sheets, plates, rods, spikes, plates or other independent structures. If desired, it can be sprayed onto a sheet or wall, or any other backing structure to be used in waterproofing. Alternatively, if desired, it can be used in any of the prior art structures including those defined in U.S. Pat. Nos. 3,561,177; 3,445,322; 4,279,547; 2,065,512 and 2,277,286; without fear of collapse or disintegration of the bentonite containing material. The adhesive qualities of the present composition will facilitate holding the waterproofing composition firmly in position. Whenever water seepage occurs, the preferred open faced configuration containing the present composition will permit maximum exposure to the water and allow maximum expansion of the bentonite to cause it to swell and allow its enhanced water barrier action. An open grid structure such as honeycomb, having no facings on either side, can be filled with the present composition, and the composition being totally exposed on both faces of the honeycomb grid.

In another embodiment of this invention, a foam or thermal insulation such as polyurethane can be impregnated or vacuum applied with the present composition. The cells of the foam thereby will have the strongly adhesive composition containing unswelled bentonite, and this waterproofing bentonite composition cannot be washed or dislodged from these cells by the water contacting it. Upon contact, the bentonite composition will swell in its expandable medium of foam and provide the water barrier action needed. The present composition can be used to waterproof expansion joints, walls, mines, dams, masonry, construction, oil wells, pipes, building foundations, basement or any other item or structure requiring a waterproofing protection.

Any suitable bentonite can be used including bentonite materials useful in salt water and oil. Those bentonite materials are identified as G. P. G. bentonite, formulated by American Colloid Company, Skokie, Illinois.

PREFERRED EMBODIMENTS OF THE INVENTION

A preferred formulation in making the composition of this invention is as follows:

| Bentonite | 75–92 parts by weight |
| --- | --- |
| polybutylmethacrylate | 2.5–6 parts by weight |
| dibutylphthalate | 2–3 parts by weight |
| Benzene | 20–60 parts by weight |

A second preferred formulation in making the waterproofing composition of this invention comprises:

| Bentonite | 75–92 parts by weight |
| --- | --- |
| dibutylphthalate | 1–2 parts by weight |
| Acetone | 10–15 parts by weight |
| Cellulose acetate | 1–5 parts by weight |
| diethyloxalate | 1–2 parts by weight |
| Benzene | 30–50 parts by weight |

The compositions of this invention can be prepared in one embodiment by mixing under reaction conditions about 85 parts of unswelled bentonite, with up to about 5 parts of cellulose acetate and up to about 6 parts of diethyloxalate plasticizer. This composition is then homogenized by continuous agitation for about 10 minutes. It could then be spread evenly on a substrate or can be used as a self-supporting structure.

The compositions of this invention can also be prepared by mixing:

| Bentonite | 95–96 parts |
| --- | --- |
| Sucrose acetate isobutyrate | 4–6 parts |
| Polymethylmethacrylate | 3–5 parts |
| Alcohol-Isopropyl alcohol | 30–60 parts |

The composition of this invention may be used as a waterproofing composition alone or together with an insulating frame, a substrate or a water impervious backing layer of any suitable material. In addition, it could be used, if desired, in any of the building components described in U.S. Pat. Nos. 3,561,177; 3,445,322; or 4,279,547. It is important to note however, that the composition of this invention resides in a self-supporting layer that may be used as such without the need for supporting structures or backing.

It should be understood that various modifications and ramifications of this basic invention will become apparent to those skilled in the art upon a reading of this disclosure. These are intended to be included within the scope of this invention. Also, materials can be added to this composition or can be used together in this composition; these also are contemplated to be included within the spirit of this invention. The present composition can be used alone without any supporting structure or can be used if desired with open faced grids, one face open structures, or completely closed structures. It can also be used in foams, sponges, walls, around pipes or can be deposited or sprayed onto any desired structure.

What is claimed is:

1. A self-sustaining waterproofing composition at least 75% of a substantially unswelled bentonite and the remainder a film forming composition, said film forming composition comprising an organic binder that is solid at room temperature and is substantially unreactive with said bentonite, said bentonite suspended substantially uniformly throughout said film forming composition to form thereby a substantially self-sustaining waterproofing element and wherein said film forming composition contains an alkylphthalate present in from about 0.1 to 5% of said total composition.

2. The waterproofing composition of claim 1 wherein said film forming composition contains dibutylphthalate.

3. The waterproofing composition of claim 1 wherein said film forming composition contains polybutylmethacrylate present in an amount of from about 0.1 to 7% of the total composition.

4. A self-sustaining waterproofing composition prepared by a method comprising mixing a solvent substantially unreactive with bentonite, a bentonite which is prewetted with said solvent, from about 2 to 3% dibutylphthalate and from about 0.5 to 6% polybutylmethacrylate, said bentonite being present in said composition in an amount of at least 75% of said final resulting composition.

5. A self-sustaining waterproofing composition prepared by a method comprising mixing at least 75 parts of solvent wetted bentonite with (A) a material selected from the group consisting of dialkylphthalate, dialkyloxalate, sucrose acetate isobutyrate, glycerine and mixtures thereof, (B) said solvent being substantially unreactive with said bentonite and containing from about 30 to 50 parts benzene, and (C) a material selected from the group consisting of polyalkylmethacrylate, cellulose acetate, polyvinylalcohol, polyvinylbutyral, and mixtures thereof.

6. The resulting composition of claim 5 containing from about 1 to 2 parts dibutylphthalate.

7. The resulting composition of claim 5 containing from about 1 to 2 parts diethyloxalate.

* * * * *